United States Patent [19]

Möller et al.

[11] Patent Number: 6,013,921

[45] Date of Patent: Jan. 11, 2000

[54] METHOD OF MEASURING A MASS FLOW DISTRIBUTION OF A FLOW

[75] Inventors: Thorsten Möller, Göttingen; Karl-Aloys Bütefisch, Bovenden; Jürgen Kompenhans, Gleichen, all of Germany

[73] Assignee: Deutsches Zentrum fur Luft-und Raumfahrt e.V., Koln, Germany

[21] Appl. No.: 08/985,942

[22] Filed: Dec. 5, 1997

[30] Foreign Application Priority Data

Jan. 27, 1997 [DE] Germany .................. 197 02 849

[51] Int. Cl.[7] .................................................. G01N 15/06
[52] U.S. Cl. ........................................ 250/573; 250/356.1
[58] Field of Search .................................. 250/573, 574, 250/575, 356.1; 73/54.08; 356/385, 861.04

[56] References Cited

U.S. PATENT DOCUMENTS

| | | | |
|---|---|---|---|
| 3,809,480 | 5/1974 | Somerville et al. | 356/103 |
| 4,228,353 | 10/1980 | Johnson | 250/356.1 |
| 4,729,109 | 3/1988 | Adrian et al. | 364/560 |
| 4,885,473 | 12/1989 | Shofner et al. | 250/574 |
| 5,170,060 | 12/1992 | Maillard et al. | 250/560 |
| 5,170,438 | 12/1992 | Anger et al. | 382/1 |
| 5,231,463 | 7/1993 | Shambaugh | 356/336 |
| 5,396,333 | 3/1995 | Aleshin et al. | 356/385 |
| 5,701,172 | 12/1997 | Azzazy | 356/28 |

FOREIGN PATENT DOCUMENTS

| | | | |
|---|---|---|---|
| 0 672 894 A2 | 3/1995 | European Pat. Off. | G01F 1/712 |
| 42 00 3009 A1 | 7/1993 | Germany | G01P 5/20 |
| 43 13 682 C2 | 10/1994 | Germany | G01F 1/704 |
| 3-56826 | 3/1991 | Japan | G01F 1/704 |
| WO 90/10876 | 9/1990 | WIPO | G01P 3/36 |

*Primary Examiner*—Edward P. Westin
*Assistant Examiner*—Thanh X. Luu
*Attorney, Agent, or Firm*—Womble Carlyle Sandridge & Rice

[57] ABSTRACT

In a method of measuring a mass flow distribution of a flow over a measuring plane (8), a light section (5) extending parallel to and around the measuring plane is formed, the light section having a small thickness (7). A picture is recorded, vertically to the measuring plane and during a defined interval of time ∆t, of particles carried by the flow and passing through the light section. The distribution of the images of the particles (4) in the picture is evaluated for the mass flow distribution.

4 Claims, 3 Drawing Sheets

METHOD OF MEASURING A MASS FLOW DISTRIBUTION OF A FLOW

FIELD OF THE INVENTION

The invention is related to a method of measuring a mass flow distribution of a flow over a measuring plane. The flow may be derived from a liquid, or, in particular, from a gaseous fluid. The mass flow of a flow is the mass flow rate of the fluid per unit of area through a specific measuring plank.

BACKGROUND OF THE INVENTION

Known methods of measuring the mass flow distribution of a flow over a measuring plane use sensors which are inserted into the flow and there, at certain points, measure the local mass flow. For measuring the mass flow distribution over the entire plane, all points must be approached by the sensors. By this method it is not possible to measure temporary mass flow distributions over the entire plane or even over partial areas of the measuring plane. In addition, the insertion of the sensors into the flow must result in an undesired modification to the flow.

OBJECT OF THE INVENTION

Therefore, it is an object of the invention to provide a method of measuring a mass flow distribution of a flow over a measuring plane, by which the mass flow distribution is simultaneously measurable at all points of the respective measuring plane without interference of the flow.

SUMMARY OF THE INVENTION

The invention provides a method of measuring a mass flow distribution of a flow over a measuring plane comprising the steps of forming a light section extending parallel to and around the measuring plane, the light section having a small thickness; recording a picture, vertically to the measuring plane and during a defined interval of time $\Delta t$, of particles carried by the flow and passing through the light section; and evaluating the distribution of the images of the particles in the picture for the mass flow distribution.

The invention starts from a flow of a fluid which carries light scattering particles. In the light section, there must be a sufficient optical contrast between the fluid and the individual particle for individualizing the particles in the light section. Preferably, the fluid is clear. Good operation conditions, for example, exist automatically if the atmosphere is slightly seeded with dust. Moreover, on the examination of flows, flows are frequently artificially seeded with light scattering particles in order to determine the speed of the particular flow according to so-called particle image velocimetry (PIV)-methods. The new method only requires that sufficient high-contrast light scattering particles are carried by the flowing fluid. Their origin, however, does not matter. With the new method, the particles carried by the fluid represent the mass flow of the fluid itself. The particles are required to follow the fluid without friction, and the concentration of the particles in the fluid has to be defined while their number remains constant, i.e. no particles disappear or are added. This does not require a homogenous concentration of particles in the fluid. However, a quantitative relation between the distribution of the images of the particles in the picture as determined by the new method and the mass flow to be recognized is only given at a known concentration of the particles in the fluid. In this case, the local density of the images of the particles is directly proportional to the local mass flow through the measuring plane.

Even in case of unknown and non-homogenous concentrations of particles in the fluid, however, a meaningful statement can be derived from the pictures made by applying the new method. The distribution of the images of the particles in a picture can be qualitatively compared with a previously recorded distribution.

If clear changes in the local density maxima between the images of the particles result, the flow has changed between the exposure of the two pictures. In a concrete application, this evaluation of the recorded pictures may be used for determining whether an obstacle appeared in a pipe or a passageway subject to a flow.

If the distribution of the particles can be quantitatively compared with a particular density of images which corresponds to a particular mass flow, the conditions for the execution of the new method are ideal. For this purpose, the absolute concentration of the particles in the fluid need not be known. Through calibration achieved by measuring with a mass flow sensor, for example, a particular density of the images of the particles can be assigned to a particular mass flow. From this, the mass flow can be calculated at other points in the plane in a very simple manner.

The particular density of the images of the particles can be determined on the basis of a picture of the particles which covers the entire cross section of the flow. From a known total rate of flow and the dimensions of the cross section, on the one hand, the mean mass flow can be calculated, and, on the other hand, the mean density of the images of the particles exactly corresponds to this mean mass flow. Higher densities correspond to higher mass flows, smaller densities to smaller mass flows.

The particular density can be determined at the same location at which the measurement of the relevant mass flow takes place. Frequently, however, it is more advantageous, to provide a check plane for the determination of the particular density, at which the entire cross section of the flow is more easily measurable. In the relevant measuring plane, it is not necessary to measure the entire cross section of the flow which, under many test conditions, would not be possible with a single light section at all.

Preferably, the check plane is arranged upstream to the relevant measuring plane. In this case, branching of the flow may occur between the check plane and the relevant plane, without having a negative impact on the evaluability of the measurement of the particles passing through the light section in the area of the relevant measuring plane.

The results of the new method can be distorted by reverse flows appearing in the area of the light section, which increase the absolute number of particles passing through the light section. This increase, however, does not correspond to a higher mass flow, as two particles passing the light section in opposite directions do not effectively increase the mass flow. If reverse flows are to be expected, it may be practical to measure the mass flow distribution according to the new method in two subsequent planes with regard to the flow. Areas with strong reverse flow are conspicuous compared to the second plane because of their apparently excessively high mass flows and/or excessively high densities of images of particles in the respective light section.

In addition to the single-exposed picture of the particles in the light section, a double-exposed image of the particles in the light section can be recorded in order to determine the flow speed in the individual plane according to a PIV-method. Such PIV-methods are known.

In connection with this invention, a modified form of the standard PIV-method can be applied, wherein the particles are exposed in light sections arranged subsequently and parallel in twos and only partially overlapping. In this manner, a flow speed vertically to the plane of the individual light sections is also measurable.

As already mentioned, the particles may be particles naturally appearing in the flow. They may be also artificially added to the flow. In this case, it is particularly interesting to seed the flow with the particles in a specific concentration. With this concentration, a particular density of the images of the particles depicted can be converted into a specific mass flow. This is illustrated by means of the following example:

The number N of the images of the particles depicted results exactly from following equation (I):

$$N = (A*d + A*v*\Delta t)*K*r,$$

with A being the covered area of the light section, i.e. the area of the measuring plane, over which the passing mass flow is to be measured, d being the thickness of the light section, v being the velocity of the particles perpendicular to the measuring plane, $\Delta t$ being the duration of the exposure of the picture, K being the concentration of the particles per kilogram of the fluid and r being the density of the fluid. Provided that the summand A*d is much smaller than summand v*t*A, the above equation is simplified to equation (II):

$$N = v*\Delta t*A*K*r.$$

The mass flow r * v in the unit kilogram per square meter and second results from equation (III):

$$r*v = N/A*1(\Delta t*K).$$

N/A is the density of the images of the particles depicted in relationship to the covered area of the measuring plane. An enlargement factor or reduction factor f which allows for the enlargement and/or the reduction when imaging the area, makes it possible to use area a in the picture of the particles instead of area A. Hence, equation (IV) applies:

$$r * v=N/a * f/(t * K).$$

N/a can be easily determined from the picture of the particles. f/(t * K) is a constant determinable from known parameters, with which the mass flow r * v can be easily calculated. At known velocity v, the density, and/or at a constant temperature, the pressure of the fluid, and, at known density, the speed of the fluid is derived from the mass flow.

In the following, the invention is explained and described in more detail by means of preferred embodiments.

DETAILED DESCRIPTION OF THE PREFERRED EMBODIMENTS

Figure 1:
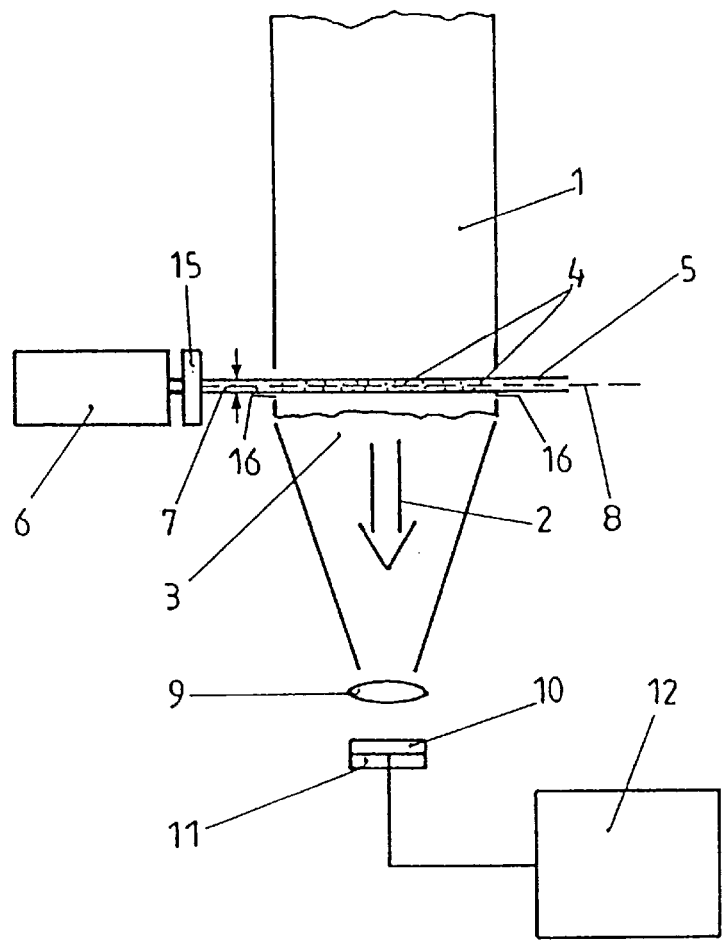
FIG. 1 illustrates a first embodiment of the method according to the invention.

FIG. 1 shows a pipe 1, in which a fluid 3 flows in the direction of an arrow 2. The fluid may be a gas. The fluid 3 carries particles 4, which pass a light section 5 in the area of a window 16 in the pipe 1 and which are illuminated during passing the light section. The light section 5 is illuminated by a light source 6, which is preferably a laser with subsequent optics indicated as a cylinder lens 15. The light section 5 covers the entire cross section of the flow, but has only a negligible thickness 7 around a geometric measurement plane 8. The particles passing through the light section 5 are imaged on an image sensor 10 by a projection lens 9. The image sensor 10 can be a CCD sensor. By means of image sensor 10, a picture of the particles 4 passing through the light section is recorded during the interval of time $\Delta t$. The duration of the exposure $\Delta t$ can be established by triggering the image sensor 10 or by triggering the light source 6, in particular if the light source 6 is a pulse laser. The picture of the image sensor 10 is digitalized by frame grabber 11 and transmitted to a digital evaluation unit 12. Evaluation unit 12 determines local mass flow through the measuring plane 5 from the local densities of the images of the particles in the picture. In order to quantitatively determine the local mass flow, either a concentration K of the particles 4 in the fluid 3 must be known or, at least, the total mass flow of the fluid 3, i. e. the flow rate through pipe 1 must be known and the concentration K of the particles in Fluid 3 must be homogeneous.

Figure 2A:
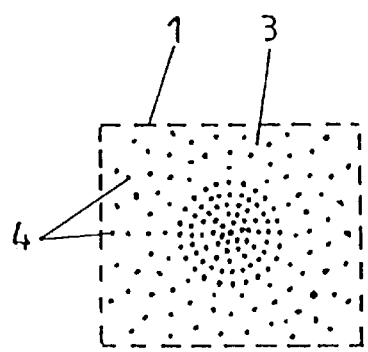
FIG. 2 shows three different pictures obtained by the method of FIG. 1 in a highly schematic representation.
Figure 2B:
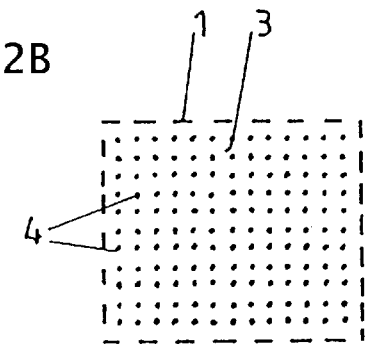
Figure 2C:
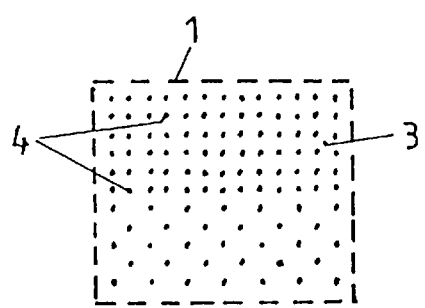

Even without knowledge of these values, a qualitative evaluation of the images of the particles passing through light beam 5 is reasonably possible. FIG. 2a, for example, shows an image characteristically recorded at the exit of a square pipe 1 subject to laminar flow during the implementation of the method according to FIG. 1. The images of particles. 4 concentrate on the free center of the pipe, in which fluid 3 is not slowed down by frictions at the wall of pipe 1. FIG. 2b, in turn, shows an example of a highly turbulent flow in same pipe 1. In this case, the concentration of the images of particles 4 is almost homogenous, as due to the turbulence in fluid 3, no regular distribution of the mass flow exists across the cross section of pipe 1. FIG. 2c, in turn, shows an example of a laminar flow through pipe 1. In this case, the images of particles 4 concentrate on the upper half, because an obstacle is located in the bottom half of pipe 1, through which fluid 3 cannot flow. Such an obstacle is determinable by means of the mass flow distribution across the cross section of pipe 1, even if this obstacle is not directly visible from the free end of pipe 1. However, the density distribution of the images of particles 4 shown in FIG. 2c appears only if an obstacle is positioned in the bottom area of the pipe closely upstream the free end of pipe 1. However, a reduction in the absolute number of particles would be still determinable at quite a distance behind the obstacle, if the obstacle retains some of the particles.

The scanning of particles 4 passing through light beam 5 must not be vertical to plane 8. If a picture is taken at an angle, however, particularly in the case of a quantitative evaluation of the mass flow, the resulting distortion must be taken into consideration.

Figure 3:
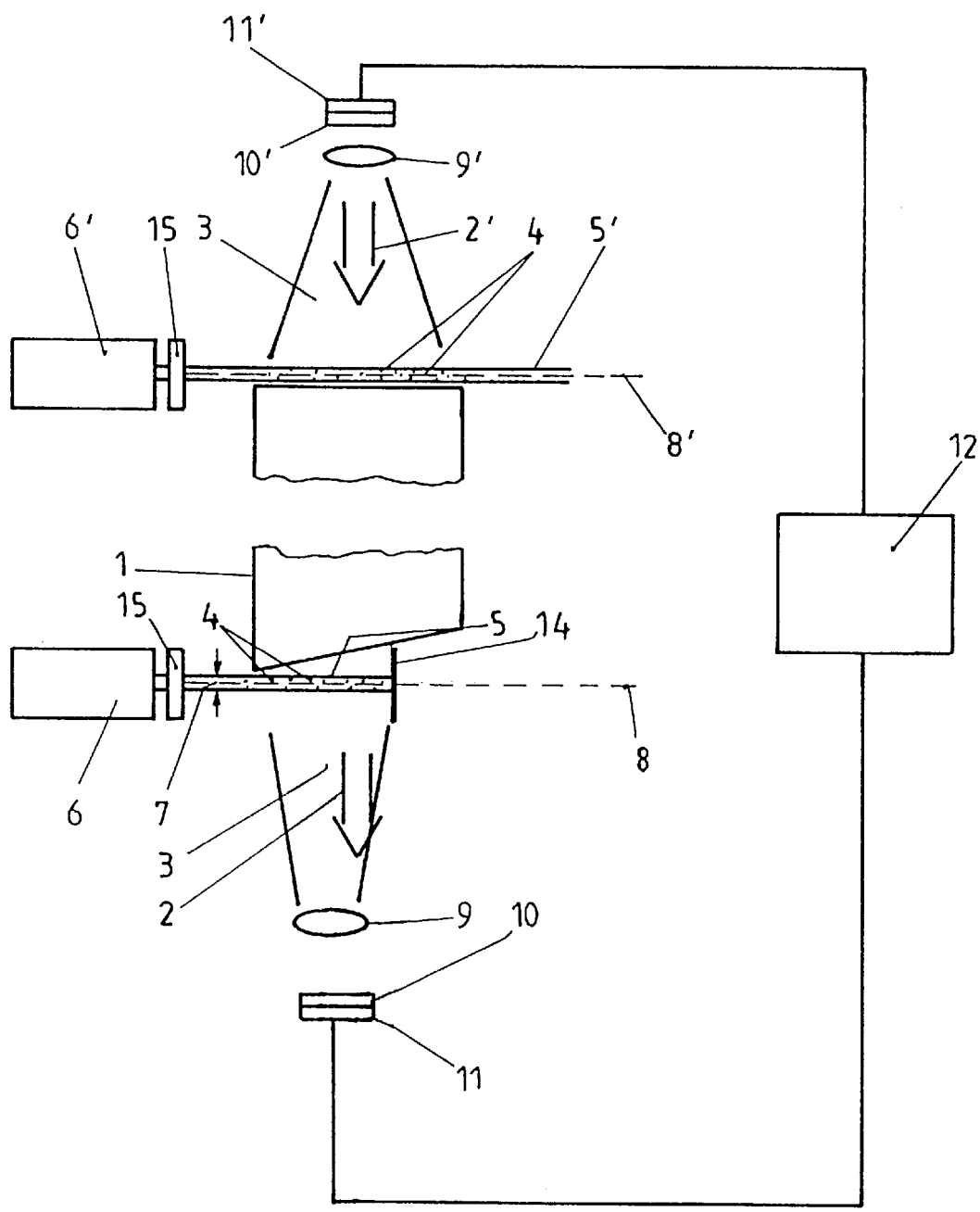
FIG. 3 illustrates a second embodiment of the method according to the invention and FIG. 4 illustrates a third embodiment of the method according to the invention.

FIG. 3 illustrates the structure of a modified embodiment of the new method. In this case, not only particles 4 passing through light section 5 at the end of the pipe 1 are shown. A second light source 6' for the illumination of a second light section 5' about a check plane 8' upstream of the entry of the pipe 1 is provided. By means of this second Light section 5', the flow entering pipe 1 in the direction of arrow 2' is measured across the entire cross section by projection lens 9' and image sensor 10'. In contrast, the projection lens 9 together with the image sensor 10 cover only a partial area of the flow emerging from the end of the pipe 1. The information obtained from check plane 8', however, allows a quantitative statement on which part of the mass flow entering pipe 1 passes through the area of the measuring plane 8 recorded by the projection lens 9. This is particularly interesting, because of an object 14 located in the flow prevents the light beam 5 from covering the flow across its entire cross section.

Figure 4:
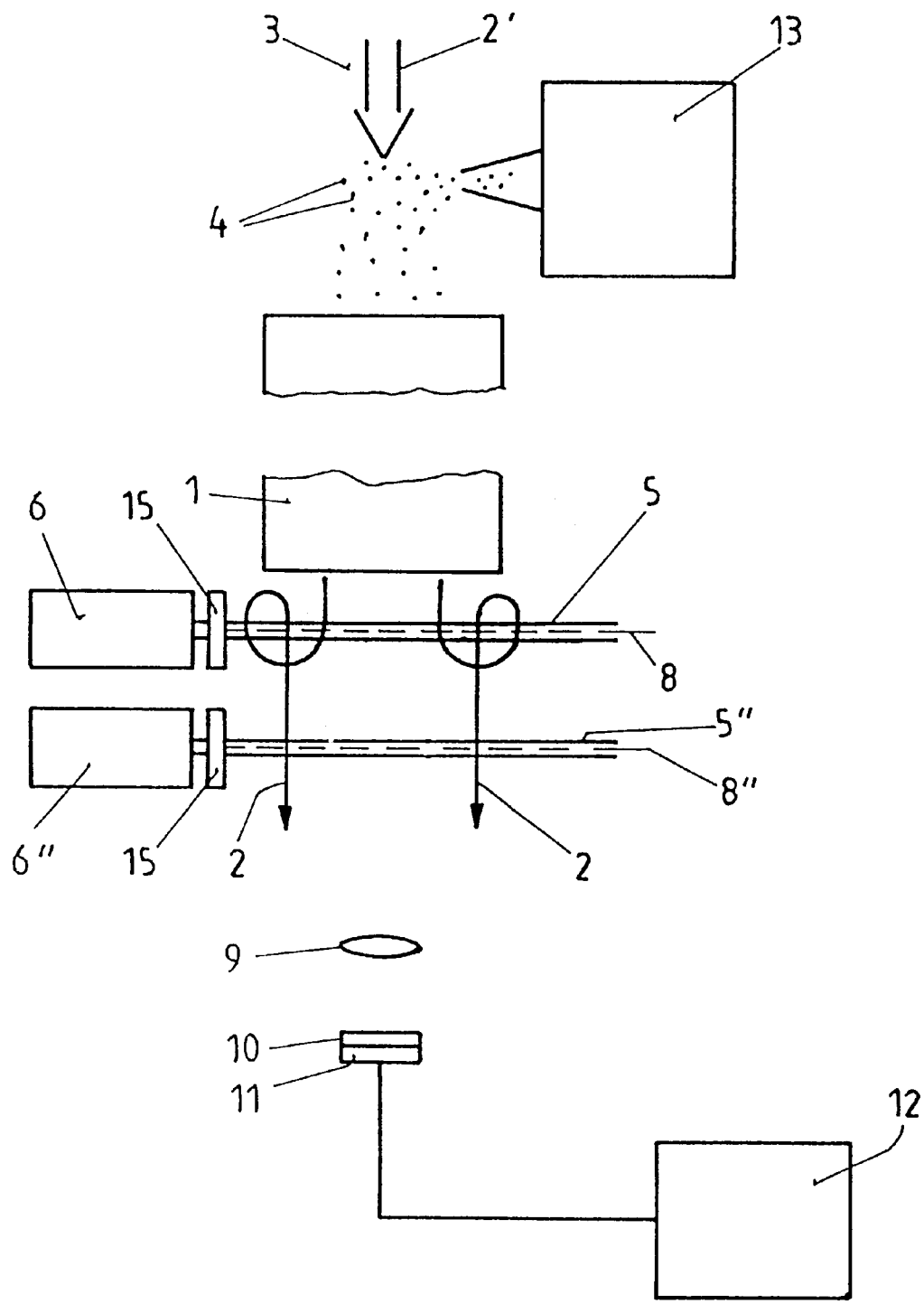

The embodiment of the method illustrated in FIG. 4 refers again to the example of the pipe which is subject to a flow. In this case, however, the arrows 2 indicate that a reverse flow occurs directly at the exit of the pipe. The course of the flow indicated by arrows 2 is not necessarily realistic. However, it clearly illustrates the underlying problem. The particles, the movement patterns of which are indicated by the arrows 2, pass the light section 5 around the measuring plane 8 three times. This suggests a three times higher total mass flow through the measuring plane on the application of the new method than actually exists. This is made obvious by the additional implementation of the method on parallel measurement plane 8" which is not subject to such reverse flows. For the measuring planes 8 and 8", a single projection lens 9 and for recording the corresponding pictures, a single image sensor 10 can be provided. However, a separation of the pictures from the two light sections 5 and 5" must be provided. For example, the light beams 5 and 5" can be alternately illuminated for this purpose. In FIG. 4, an aerosol generator 13 is indicated at the entrance of pipe 1 which seeds the fluid 3 flowing past the entrance with the particles 4 in an exactly specified concentration K. This known concentration allows for the quantitative evaluation of the density of the images of the particles 4 into mass flows of certain size.

The required devices for the new method also allow for the implementation of known PIV methods for measuring the velocity of the particles in the relevant light section 5. A conventional PIV method, however, measures only the velocity components of the particles in the plane of the relevant light section.

In the illustrated embodiments of the method the light section 5 is arranged vertically to the main direction of movement of the flow indicated by the arrows 2. However, the new method can be implemented using a light section at an angle to the flow. A quantitative evaluation remains possible, as long as the effective thickness of the light section for the passing particles is clearly smaller than the path travelled by the individual particle during the duration of exposure $\Delta t$ of the relevant picture. For a PIV-method however, these peripheral conditions are relatively unfavourable.

Drawing Reference Legend

1=pipe
2=arrow
3=fluid
4=particles
5=light section
6=light source
7=thickness
8=measuring plane
9=projection lens
10=image sensor
11=frame grabber
12=evaluation unit
13=aerosol generator
14=object
15=cylinder lens
16=window

What is claimed is:

1. A method for measuring a mass flow distribution of a flow over a measuring plane, the method comprising the steps of:

(a) forming a first light section extending parallel to and around a check plane, the first light section having a small thickness and covering the entire cross section of the flow;

(b) recording a first picture, vertically to the check plane and during a defined interval of time ($\lambda t$), of particles carrried by the flow and passing through the first light section;

(c) evaluating a particular density from the images of the particles in the first picture, the partivular density corresponding to a particular mass flow;

(d) forming a second light section extending parallel to and around the measuring plane, the second light section having a small thickness and covering a portion of the cross section of the flow;

(e) recording a second picture, vertically to the measuring plane and during a defined interval of time ($\lambda t$), of particles carrried by the flow and passing through the second light section;

(f) evaluating a local density from the images of the particles in the second picture; and (g) quantitatively determining the local mass flow through the measuring plane by comparing the local density from the images of the particles in the second picture with the particular density from the images of the particles in the first picture.

2. The method of claim 1, wherein the check plane is located upstream of the measuring plane.

3. The method of claim 1, further comprising the step of recording a double-exposed third picture of the particles in the second light section, in addition to the single-exposed second picture of the particles in the second light section, to determine flow velocities in the measuring plane according to a particle image velocimetry (PIV) method.

4. The method of claim 1, further comprising the step of seeding the flow with particles in a specific concentration.

* * * * *